April 26, 1960

C. E. KLEIBER 2,934,494

RECOVERY OF FINELY DIVIDED SOLIDS

Filed Aug. 15, 1957

Carl E. Kleiber Inventor

By George J. Hilbert Attorney

April 26, 1960  C. E. KLEIBER  2,934,494
RECOVERY OF FINELY DIVIDED SOLIDS
Filed Aug. 15, 1957  3 Sheets-Sheet 3

Carl E. Kleiber  Inventor

By *George J. Silbey*  Attorney

United States Patent Office 2,934,494
Patented Apr. 26, 1960

2,934,494

RECOVERY OF FINELY DIVIDED SOLIDS

Carl E. Kleiber, Pleasant Hill, N.J., assignor to Esso Research and Engineering Company, a corporation of Delaware Application August 15, 1957, Serial No. 678,346

16 Claims. (Cl. 208—161)

This invention relates to recovering finely divided solids from fluids.

In fluidized solids processes where finely divided solids are contacted with fluids, the efficiency of the separation and recovery of the finely divided solids from the process fluids is of great economic importance. In such processes as catalytic cracking, hydroforming, coking, ore reduction and catalytic processes generally where finely divided solids are used, it is essential to remove as much solids as possible from the gaseous fluids being discharged from the reaction zone or from the regenerator or burner into the atmosphere, both from a pollution angle and the retention of solids such as catalysts in the system.

In addition, in the proper functioning and most efficient operation of a fluidized solids system, such as catalytic cracking or hydroforming, it has been found necessary to maintain a certain amount of extremely fine particles in the fluid catalyst bed both in the reactor and the regenerator in order to obtain the most efficient contacting between the fluids and the solid particles. Also, it is essential to maintain a certain amount of fine particles in the circulating catalyst system to attain efficient and smooth operation of the unit.

As a specific process example fluid hydroforming will be referred to, as the present invention is especially adapted for use with hydroforming. However, the invention is not to be restricted thereto but is also applicable to catalytic cracking, coking and other hydrocarbon conversion processes as well as other processes using finely divided solids. In hydroforming, hot naphtha vapors at a temperature between about 900° F. and 1025° F. and hydrogen-containing gas at a temperature between about 1050° F. and 1200° F. are passed upwardly through the reactor at a velocity of about 0.3 to 1.5 feet per second under an operating total pressure of between about 100 p.s.i.g. and 750 p.s.i.g. to form a fluidized bed of catalyst particles as is well known in the art. The converted vapors pass into a dilute phase above the dense fluidized turbulent bed and contain entrained catalyst particles. The converted vapors are passed through a series of dust separating devices such as cyclone separators or the like for separating solids or dust from the converted vapors and for returning the solids or dust to the fluid bed in the reactor. Two, three or more cyclone separation stages may be used.

Heretofore, it has been the practice in the design and construction of cyclone type or centrifugally actuated separation devices, that when two or more such separation stages are utilized, the gas or vapor velocities through a series of such stages were equal or substantially equal. Thus, the dust separators of these stages were approximately all of the same size, an arrangement that has been commonly employed for simplicity's sake and concern regarding erosion of the dust separators because of the dust-laden gas or vapor, and attrition of the solid particles in their passage through the solids or dust recovery system.

In some installations using finely divided catalyst, electric precipitators such as Cottrells were used as a secondary recovery system after the mechanical cyclone separators to recover dust or finely divided material, but such precipitator systems are expensive and difficult to maintain in continuous operation. As a result many of the newer installations have eliminated such expensive secondary solids recovery systems as Cottrells. However, it has been found in fluid catalytic cracking and hydroforming that it is necessary to maintain a certain amount of fines in the 0 to 40 micron particle size range to obtain proper fluidization of the catalyst particles, increased standpipe stability and pressure build up, improved catalyst circulation and better contacting between the gaseous fluids and the catalyst particles in the reactor and regenerator. In some cases in order to maintain the proper amount of fines, the addition of special fine grade fresh catalyst to the unit or removal of coarse catalyst from the unit which would be ground and returned to the unit would be employed. However, such practice because of poor fines recovery equipment would result in high fines losses and undue operating costs.

A further relationship exists between the fines content and entrainment of solids from a fluidized solids bed, namely an inverse relationship. Thus, a high fines content between about 10 percent and 30 percent or more by weight reduces entrainment of fines into the cyclone separators. This reduced loading of solids into the cyclone separators, as well as the smaller particles sizes results in reduced equipment erosion. For this additional reason it is desired to maintain about 10 to 30 percent by weight of 0–40 micron fines in the system. In commercial units the 0–40 micron fraction is composed chiefly of 20 to 40 micron particles.

It is known that, in using a series of dust separators such as cyclone separators, the coarsest solids or catalyst particles separate out in the first separation stage, the less coarse or finer solids separate out in the second separation stage and the finest recoverable solids separate out in the third separation stage. If a Cottrell is used following the cyclone separation stages, the solids recovered are extremely fine usually being below about 20 microns in size depending, of course, on the collection efficiency of the latter.

As pointed out above the present invention is especially adapted for use in fluid hydroforming to give better reactor operation. For example, comparing catalytic cracking with hydroforming, the catalytic cracking reactor tends to be more efficient in gas or vapor-catalyst contacting than the hydroforming reactor. One difference is in the construction and operation of the cracking units in that the oil to be cracked is mixed with hot regenerated catalyst and passed through a turbulent riser or transfer line with completion of the cracking or reaction in an agitated fluid dense bed. In the cracking reactor the catalyst holdup is usually not more than one to three times the unit catalyst circulation rate (tons per minute) and often much less. In contrast, the fluid hydroforming reaction takes place entirely within the reactor vessel and one in which a large catalyst holdup is involved, usually about 100 times the unit catalyst circulation rate.

Thus in catalytic cracking, the catalyst movement by itself contributes greatly to the contacting efficiency. On the other hand, in fluid hydroforming, the contacting efficiency in the reactor vessel is promoted chiefly by effectiveness in gas distribution and the passage of the gas or vapor upwardly through about 40 feet of catalyst bed depth. It has been found that increase in fines content of the circulating catalyst increases the efficiency of the fluid hydroforming unit, especially at fines levels below about 10 to 15 percent. However, it is also important in fluid catalytic cracking to maintain a certain percentage of 0–40 micron material in the catalyst mixture but the overall reaction efficiency is not as sensitive on this as is the fluid hydroforming reactor. However, for smooth and larger rates of fluidized solids transfer and good standpipe pressure buildup and stability in all fluidized solids processes, the need of a certain content of fines is essential.

According to the present invention, a fluidized solids recovery system is provided for units where the value of the catalyst particles is high, where air pollution is an important factor and in all fluidized solids systems using finely divided solids where it is essential to maintain a certain amount of fines or finely divided solids in the system to maintain proper fluidity of the solids and efficient contacting of the gaseous fluids and solids in the reaction zone or zones.

According to the present invention, provision is made for increasing the velocity of the gaseous fluid passing through the final stage of a dust recovery system used in fluidized solids processes. More specifically the second or final dust separator such as a cyclone separator is selected to have a vapor or gas velocity about 50 percent or more greater than that of the first stage cyclone separator. The higher cyclone velocities so obtained will advantageously secure enhanced solids fines recovery in the last stage of cyclone separators. The preferred manner of accomplishing this result in a catalyst recovery system is to make the last stage cyclone separator of a smaller size than the first stage or earlier stage cyclone separators.

Where the gaseous fluid containing the finely divided solids is to be recovered or is a waste product and where there is no chance of upsetting operation of a unit in which finely divided solids are used, other ways of increasing the inlet velocity of the gaseous fluid being passed into the cyclone separator inlet may be used, as for example, introducing an extraneous gaseous fluid such as steam, for example, into the cyclone separator inlet to increase the velocity of the gaseous suspension being introduced into the last stage cyclone separator.

Figure 1:
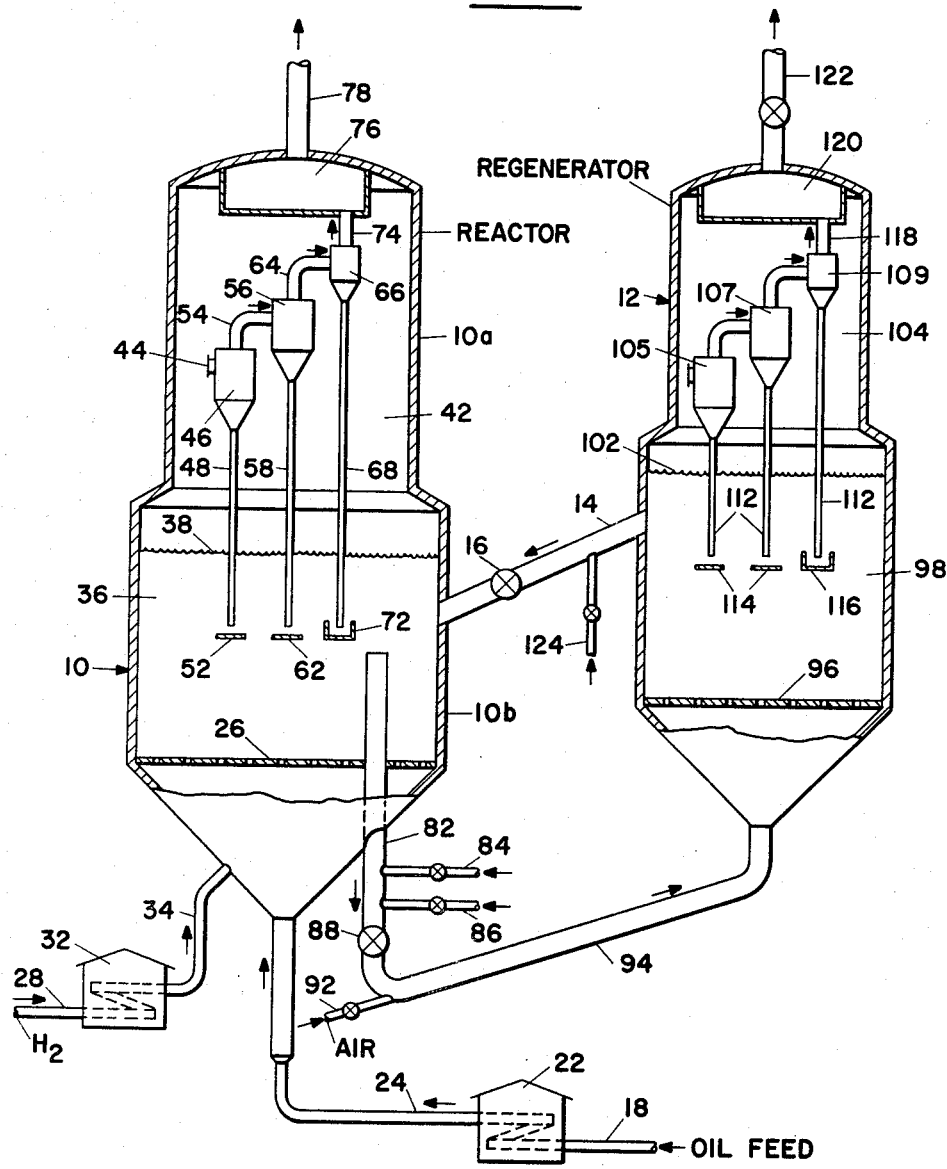
Fig. 1 represents a front elevation of an apparatus useful for hydroforming with parts in section to facilitate the disclosure.
Figure 2:
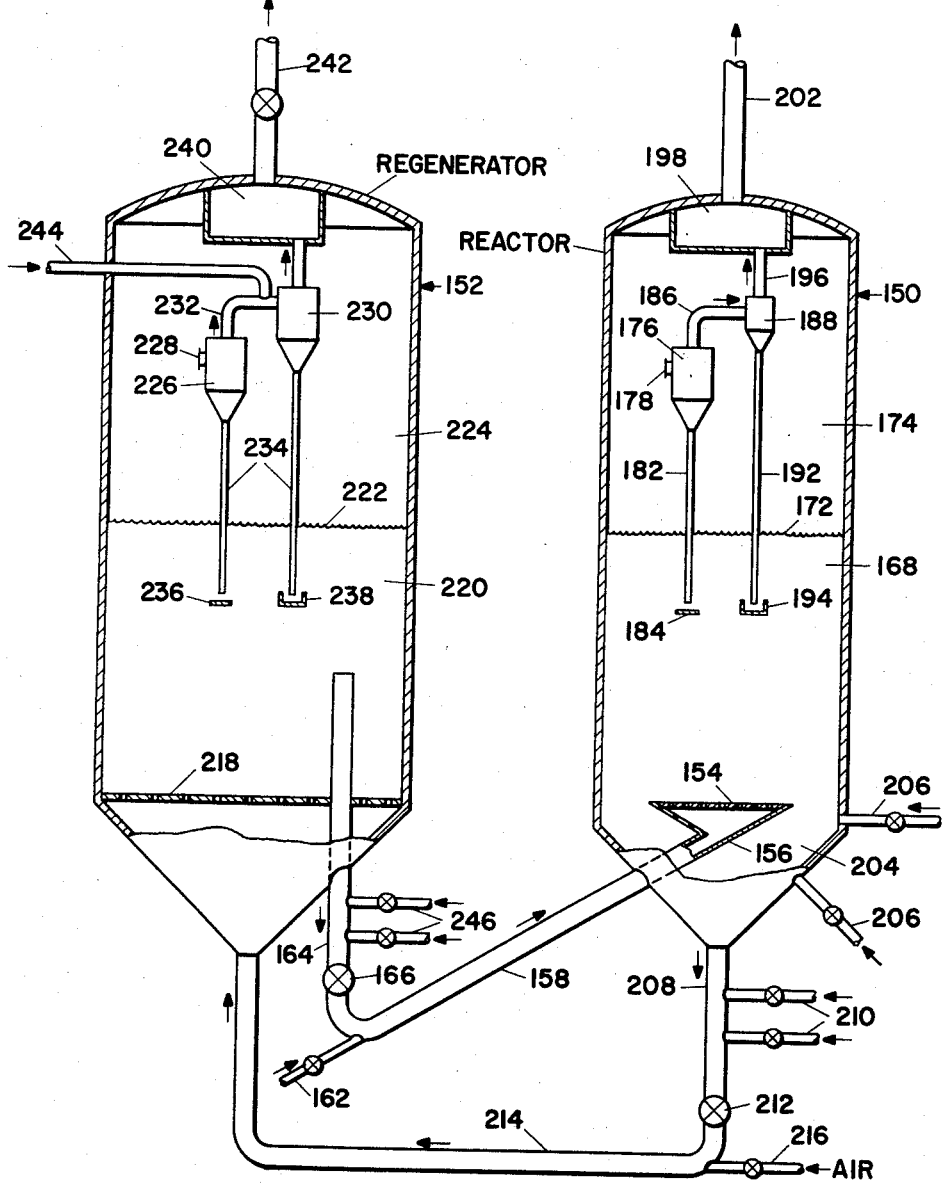
Fig. 2 represents a front elevation of another form of apparatus adapted for practicing the present invention with parts in section.

Referring now to Fig. 1 of the drawing, the reference character 10 designates a reaction vessel and reference character 12 designates a regeneration vessel adapted for use in fluid hydroforming. Reaction vessel 10 has a reduced upper portion 10a and a larger diameter lower portion 10b. The apparatus shown in Fig. 2 is especially adapted for use in fluid catalytic cracking of hydrocarbons and embodies the present invention.

The reactor 10 is a vertically arranged cylindrical vessel into which hot regenerated, finely divided catalyst is passed through line 14 provided with a control valve 16. The feed to a hydroforming unit is preferably a virgin naphtha feed boiling between about 200° F. and 430° F. but other fractions may be used. Other naphthas such as cracked naphthas or coker naphthas or the like may be used. The naphtha feed is passed through line 18 and furnace 22 to heat the naphtha feed to a temperature between about 750° F. to 1050° F., preferably about 900° F. to 1000° F. The heated naphtha under a pressure of about 100 to 750 pounds per square inch gauge, preferably about 200 to 400 p.s.i.g., is passed through line 24 into the bottom of the reactor below distribution grid 26 which is located in the lower part of the reactor 10. The grid 26 is arranged horizontally.

Hydrogen or hydrogen-containing gas is introduced through line 28 and heated in the furnace 32 to a temperature between about 1050° F. and 1200° F., preferably about 1075° F. to 1150° F., and the heated gas is passed through line 34 and into the bottom of the reaction vessel 10 below grid 26. The hydrogen-containing gas is at a pressure between about 100 to 750 p.s.i.g., preferably about 200 to 400 p.s.i.g. The amount of hydrogen used is between about 3000 and 8000 cubic feet per barrel of feed. The naphtha vapors and the hydrogen-containing gas pass upwardly through the horizontal grid 26 and fluidize the finely divided catalyst shown as a bed 36 having a level indicated at 38. The finely divided catalyst particles are maintained in a dense, fluidized condition by the gaseous fluid flowing upwardly at a superficial velocity between about 0.3 and 1.5 feet per second. The catalyst to oil ratio by weight may be between about 0.5 and 5.0.

The hydroforming reaction is carried out under pressure in the presence of any well known hydroforming catalyst such as alumina-molybdena, alumina-chromia, alumina-platinum type catalysts and the like, preferably alumina molybdena. The catalyst is in finely divided form and has a particle size range between about 0 and 150 microns, with most of the particles in the range between about 20 and 80 microns. It has been found that in order to have good gas-solids contacting and good fluidization and circulation of the fluidized catalyst particles, that there must be present at least about 10 percent by weight of fines in the catalyst mixture, the catalyst fines having a particle size between about 10 and 40 microns. Preferably, the range of 10 to 40 microns size catalyst in the catalyst mixture is between about 10 and 30 percent of the catalyst mixture.

The hydroformate vapors and gas pass upwardly from the dense fluidized bed 36 into dilute phase 42 above the dense bed level 38, the dilute phase comprising a relatively dilute suspension of catalyst solids in the hydroformate vapors and hydrogen gases. In order to remove the entrained catalyst particles from the hot hydroformate vapors, the hydroformate vapors and hydrogen-containing gas are passed through inlet 44 into a dust separating means 46 shown in the drawing as a cyclone separator. The solids removed or separated are returned to the dense bed 36 through dip leg 48. Arranged below the outlet end of dip leg 48 is a splash plate 52 or other sealing device. The hydroformate vapors and gases leave the first cyclone separator 46 through line 54 and are passed to a second dust separating means, such as a cyclone separator 56. The separated solids are returned to the dense fluidized bed through dip leg 58 associated with the second cyclone separator 56. Arranged below the outlet end of dip leg is a second splash plate 62.

The hydroformate vapors and gases leaving the second cyclone separator through line 64 still contains some very finely divided solids and in this form of the invention they are passed to a third separating means which is shown as a cyclone separator 66 in the drawing. Cyclone separator 66 is provided with a dip leg 68 for returning separated solids to the dense bed 36. Arranged at the bottom of the third dip leg 68 is a cup-shaped seal pot 72 or other seal device. The third cyclone separator will be presently described in greater detail.

The hydroformate vapors and gases leave the third cyclone separator 66 through line 74 and are passed to plenum chamber 76 having an outlet 78 for conducting the hydroformate vapors and gases to a fractionating means (not shown in the drawing). During the hydroforming reaction there is net production of hydrogen and some of this excess hydrogen is removed from the gases leaving the fractionating means and further concentrated, if desired, to make a hydrogen-containing gas containing about 40 to 80 percent by volume of hydrogen which is preferably recycled to the furnace 32 for reheating and for reuse in the hydroforming reactor 10.

Returning now to the cyclone separation system of the fluid hydroformer, in previous operations high velocities of the gases passing through the cyclone separators have been avoided chiefly because of possible attrition of the expensive catalyst and the eroding action of the solids suspended in the hydroformate vapors and gases. This is especially true of the heavy loading of coarse solids going to the first cyclone separator. Further, it is known that the first cyclone separation stage removes the largest catalyst particles and the separation efficiency of cyclone separators is limited to the extent that they recover very little in the particle size range up to about 20 to 40 microns. Hence, with ordinary cyclone separators where the inlet linear velocity to the cyclone separators is below about 60 feet per second, there is substantially no recovery of the very finely divided solids below about 30 to 40 microns and these particles are lost from the system. If the 0 to 40 micron particle size catalyst is lost from the system and not replaced in some way, poorer operation results because the fluidization of the catalyst particles is not as good as it should be, there is inefficient contacting between the vapors and gases and catalyst particles, and poor unit operation in general is obtained.

According to this invention, the catalyst recovery system is designed to recover more of the 0 to 40 micron size catalyst particles and this is done by going contrary to the known teachings in the art, namely, that increasing the inlet linear velocity of the suspension passing through the cyclone separators would result in erosion of the separators and attrition of the catalyst and would perhaps give no better solids recovery. However, as pointed out above, the largest catalyst particles are removed by the first cyclone separator 46 so that the hydroformate vapors and gases passing into the latter stages of the cyclone separators contain smaller size particles. Because the suspension going to the last separation stage has a lower solids loading and also contains smaller size particles, a greatly enhanced vapor velocity for the final cyclone stage is utilized and has resulted in the recovery of a much greater percentage of fines than was heretofore possible.

Using a higher velocity with the much finer material protection against erosion is obtained by the tendency of the extremely fine particles to cling to the surfaces of the cyclone separators. According to the specific form of the invention, the velocity of the hydroformate vapors and gases passing through the last stage cyclone separator 66 is increased 50 percent or more over that of the first stage cyclone separator 46. In this particular form of the invention, the increase in velocity is obtained by using a smaller cyclone separator in the last stage. For example, if the vapor velocity in the first stage of cyclone separators is between about 60 and 70 feet per second, the higher velocities taught by the present invention are at least 90 to 105 feet per second. In some cases the enhanced velocity may be as high as 200 percent greater than that of the first cyclone stage.

Returning now to the hydroforming reactor 10, during the hydroforming reaction some carbon or coke will be deposited on the catalyst particles and the partially spent or coked catalyst particles are withdrawn from the hydroforming reactor 10 through vertically arranged withdrawal line 82 which extends above and below the horizontal grid 26. The spent or coked catalyst particles are stripped while they are being withdrawn by introducing an inert gas such as recycle gas, flue gas, or steam through one or more lines 84 for removing volatile or entrained hydrocarbons. If necessary, a line or lines 86 may be provided for introducing fluidizing gas into the withdrawal line 82 which functions as a standpipe to build up pressure by a fluidized column of the solids being withdrawn from the reaction zone 10. The withdrawal line or standpipe 82 is provided with a control valve 88. Air for combustion is introduced through line 92 into transfer line 94 below the valve 88 in standpipe 82 for mixing with the coked or partially spent catalyst for passage through the transfer line 94 to the regenerator 12 below the horizontally arranged grid 96 in the lower portion of the regenerator 12. The grid 96 may be omitted if desired.

The superficial velocity of the upflowing gas to fluidize the catalyst particles is between about 0.3 and 1.0 foot per second. The dense, fluidized bed 98 has a level indicated at 102, with a dilute phase 104 thereabove. The hot combustion gases containing some entrained catalyst pass into the dilute phase 104 and are passed through a series of three cyclone separators similar to those shown in reactor 10. The hydroformer regenerator 12 will be much smaller in size than reactor 10 and the cyclone separators in the regenerator 12 are usually smaller than those in the reactor 10.

However, the primary cyclone separator 105 and secondary cyclone separator 107 are substantially the same size, whereas the tertiary cyclone separator 109 is a much smaller size than the primary or secondary cyclone separator, so as to increase the linear vapor velocity of the gases entering the tertiary cyclone separator 109 to at least 50 percent greater than that in the inlet to the primary cyclone separator 105. The cyclone separators are provided with dip legs 112 and sealing devices 114 and 116 which are similar to those shown and described in connection with the reactor 10. The hot combustion gases leave the tertiary cyclone separator 109 through line 118 and pass to plenum chamber 120 and then through valved outlet 122 to the atmosphere.

The temperature during regeneration in the regenerator 12 is between about 1000° F. and 1200° F. and the pressure is between about 100 and 750 p.s.i.g., preferably between about 200 and 400 p.s.i.g. Hot regenerated catalyst is withdrawn from the dense fluidized bed 98 in the regenerator 12 through inclined line 14, as above described, and introduced directly into the dense fluidized bed 36 in the reactor 10. If desired or necessary, a line 124 is provided for maintaining the hot regenerated catalyst particles in a fluidized condition while they are passing through line 14. Further, if desired, the regenerated catalyst before being introduced into the reactor 10 may be treated with hydrogen-containing gas to reduce the molybdenum compound of the molybdena-alumina catalyst to the active valence state.

Referring now to the unit shown in Fig. 2, the reference character 150 designates a reaction vessel and the reference character 152 designates a regeneration vessel. The unit shown in Fig. 2 is especially adapted for use in the catalytic cracking of hydrocarbons such as gas oils to produce gasoline. However, other feed stocks such as naphthas, residual oils and the like may be used. The reactor 150 comprises a vertically arranged cylindrical vessel provided with a grid member 154 arranged centrally in the vessel and above cone 156 in the bottom portion of the reactor 150. A transfer line 158 leads to the space in the cone 156 below the grid member 154. The oil to be cracked is introduced through line 162 into the transfer line 158 into which hot regenerated catalyst is passed from standpipe 164 by control valve 166. The oil feed is preferably preheated in any suitable manner to a temperature between about 350° F. and 800° F. The catalyst is any suitable cracking catalyst such as silica-alumina, silica-magnesia, silica-alumina-magnesia, acid-treated bentonitic clays, and so forth.

The catalyst is finely divided and has a particle size between about 400 and 100 standard mesh or finer, or between about 10 and 150 microns with the major portion of the catalyst being between about 20 and 80 microns. In order to obtain most efficient fluidization of the finely divided solids, it is essential to have the catalyst mixture contain at least about 10 percent by weight of 10 to 40 micron size catalyst particles. Preferably the catalyst mixture should contain between about 10 and 30 percent by weight of the 10 to 40 micron catalyst. The superficial velocity of the hydrocarbon vapors passing upwardly in the bottom portion of the reactor 150 fluidizes the catalyst particles and forms a dense turbulent fluidized bed 168 having a level 172 with a dilute phase 174 thereabove. The dilute phase 174 is a dilute suspension of solids in gaseous reaction products.

The temperature during the cracking operation in the reactor 150 is between about 850° F. and 1050° F. and the temperature during the regeneration in the regenerator 152 is between about 1000° F. and 1200° F. The catalyst-to-oil weight ratio being fed to the reaction zone 150 through line 158 is between about 5 and 20 and the reactor space velocity (w./hr./w.) weight of oil per hour per weight of catalyst is between about 0.5 and 60.

The superficial velocity of the hydrocarbon vapors and any added steam passing up through the reaction zone 150 is between about 0.5 and 10 feet per second. In this velocity range and using commercial silica-alumina cracking catalyst containing about 13 percent alumina, the density of the catalyst bed 168 will be between about 30 and 5 pounds per cubic feet. The upflowing cracked vapors in the dilute phase 174 contain entrained catalyst which is separated by passing the vapors through a dust separator such as a cyclone separator 176 having an inlet 178 and a dip leg 182 for returning the separated catalyst particles to below the level 172 of the dense turbulent fluidized bed 168. A splash plate 184 or the like is provided below the outlet of dip leg 182. In this form of the invention only two stages of cyclone separators are used, but more stages may be used if desired.

The cracked vapors leave cyclone separator 176 through line 186 and pass through a second stage separator such as a cyclone separator 188 provided with a dip leg 192 and a sup-shaped seal pot or the like 194, arranged in the dense fluidized bed 168 in the reactor 150. The cracked vapors leave the cyclone separator 188 through line 196 to a plenum chamber 198 and then leave the top of the reactor 150 through line 202. The cracked vapors pass through line 202 to suitable separation equipment (not shown) such as a fractionator for separating the cracked products into desired products such as gasoline, heating oil, etc., and for separating higher boiling fractions for recycling to the reactor if desired.

As above pointed out, it is essential in order to obtain proper fluidization of the finely divided catalyst particles to maintain a certain percentage of 0 to 40 micron size material in the catalyst mixture which circulates between the reactor 150 and regenerator 152. Provisions are made in the form of the invention shown in Fig. 2, in which the linear inlet velocity to the last cyclone separation stage is increased at least 50 percent over the inlet linear velocity into the first cyclone separation stage 176 through inlet 178. In the preferred form of the invention this increase in velocity is obtained by selecting a smaller size of cyclone separator 188 and thereby increasing the velocity of the gaseous fluid passing through the cyclone separator 188.

During the cracking operation in the reactor 150, coke or carbonaceous material deposits on the catalyst particles and in order to operate the process continuously and economically, it is necessary to regenerate the catalyst particles as by burning with air or other oxygen-containing gas to remove the carbon or carbonaceous deposit.

The spent catalyst particles as a dense fluidized mixture flow down through stripping section 204 where entrained or entrapped volatile hydrocarbons are stripped from the catalyst and pass up into the reactor 150. Stripping gas is introduced into the stripping section 204 by one or more lines 206. From the stripping section the stripped catalyst mixture flows down into standpipe 208 provided with one or more fluidizing lines 210 for introducing aerating gas into the standpipe 208.

The standpipe 208 is provided with control valve 212 for controlling the amount of spent catalyst introduced into transfer line 214 leading to the bottom of the regeneration zone 152. Regenerating gas such as compressed atmospheric air is introduced into transfer line 214 through line 216 and this mixture is introduced into the bottom portion of the regeneration zone 152 below horizontally arranged distribution grid 218 arranged in the bottom portion of the regeneration zone 152.

The superficial velocity of the upflowing regenerating gas in regeneration zone 152 is between about 0.5 and 5 feet per second and is so selected to form the dense fluidized turbulent bed 220 of solid finely divided catalyst particles above the distribution grid 218. The dense fluidized bed 220 has a level indicated at 222 and a dilute phase 224 thereabove. While only two stages of separating devices are shown in the reactor 150 and the regeneration vessel 152, the invention is not restricted thereto as two or more stages of separating devices may be used.

As shown in the regeneration vessel 152, there are two sages of cyclone separators which are of substantially the same size. The first cyclone separator is designated 226 with an opening 228 and the second cyclone separator is designed 230. Line 232 leads from the first cyclone separator 226 to the second cyclone separator 230. The cyclone separators are provided with dip legs 234 and sealing devices 236 and 238 which are similar to those described in connection with the reactor 150. The hot regeneration gases from the second cyclone separator 230 are passed to plenum chamber 240 and then pass out to the atmosphere through valved exit line 242 from the top of the regeneration zone 152.

In order to increase the efficiency of the second cyclone separator 230 and without reducing the size of the cyclone separator, as was done in the other form of the invention, an extraneous gas such as steam, is introduced into the second cyclone separator 230 by line 244 in a sufficient amount to increase the inlet linear velocity to the second cyclone separator 230 at least about 50 percent more than that in the first cyclone separator 226. Where the linear inlet velocity, in the first cyclone separator 226 is about 70 feet per second, the inlet velocity through the second cyclone separator 230 will be at least about 105 feet per second and because of this increase in velocity in the second cyclone separator 230, the amount of 0 to 40 micron catalyst particles separated from the gases will be effectively increased.

Regenerated catalyst overflows from the dense fluidized bed 220 in the regenerator vessel 152 into the standpipe 164 above referred to. The standpipe 164 is preferably provided with aerating line or lines 246.

In a specific form of the invention, with an apparatus like that shown in Fig. 1, the reactor vessel 10 had a lower diameter section 10b of about 21.5 feet and the length of this section was about 54 feet, with about 46.5 feet of dense bed depth in section 10b. The upper smaller section 10a had a diameter of about 14 feet and a swage section between 10a and 10b of 6.5 feet. The upper section 10a had a length of about 31 feet. The temperature during hydroforming was between about 950° F. and 955° F. The catalyst was alumina-molybdena catalyst containing about 9 percent molybdena. The size of the catalyst particles was as follows:

| | Percent by weight |
|---|---|
| 0 −20 microns | 0 |
| 20 −40 microns | 10 |
| 40 −80 microns | 72 |
| 80+ microns | 18 |

Five sets of three unlined cyclone separators were arranged in the smaller diameter portion 10a of reactor vessel 10. The primary and secondary cyclone separators in each set had an inlet velocity of about 43 feet per second, and the tertiary cyclone separator in each set had an inlet velocity of about 56 feet per second.

In this specific example Ducon cyclone separators were used. The primary and secondary separators of each set in the reactor 10 were number 13SDC unlined Ducon separators and the tertiary of each set was a number 12SDC unlined Ducon separator. In this particular example the third cyclone separator of each stage was smaller than the secondary cyclone separator of each stage but this was done for convenience to fit the cyclone separators into the smaller upper diameter portion 10a of the reactor vessel 10. It will be noted that the increase in inlet velocity in the tertiary stage cyclone separators is less than 50 percent and this was inefficient to collect 10 to 40 micron catalyst particles efficiently. With this arrangement in the plant, the 10 percent by weight percentage of 10 to 40 micron catalyst was not maintained in the circulating catalyst.

Figure 3:
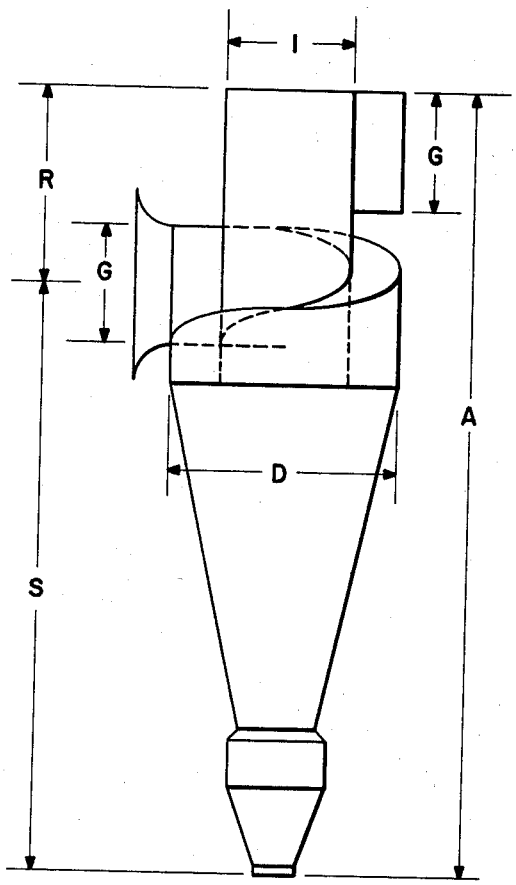
Fig. 3 represents a front elevation of a primary cyclone separator.
Figure 5:
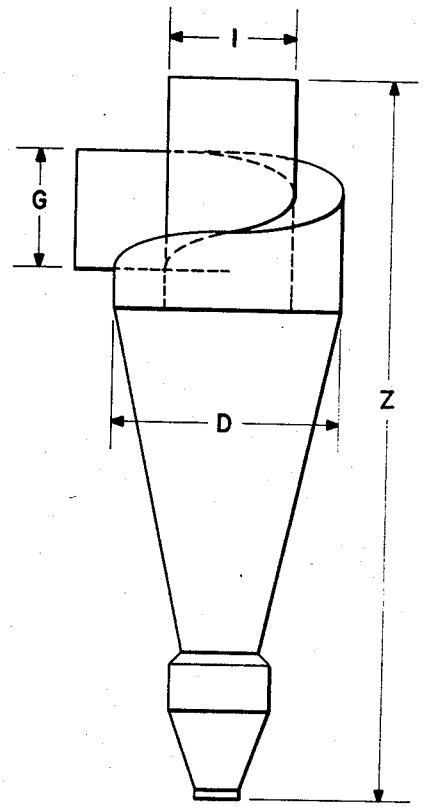
Figs. 5 and 6 represent a front elevation and a top plan view, respectively, of a secondary or tertiary cyclone separator.
Figure 4:
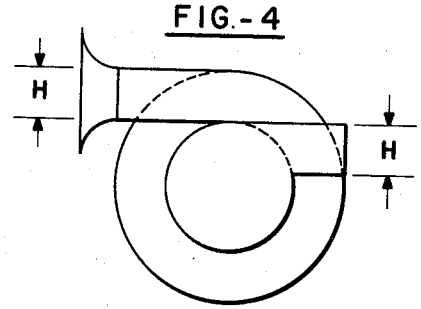
Fig. 4 represents a top plan view of the separator shown in Fig. 3.
Figure 6:
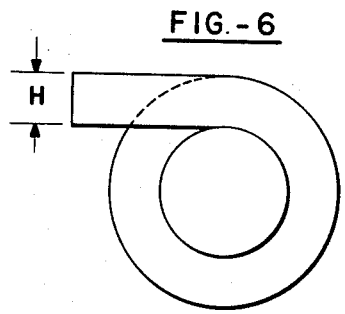

The dimension of Ducon cyclone separators referred to above and to be referred to later are as follows, with reference being made to Figs. 3-5 of the drawings.

The oil feed was virgin naphtha having a boiling range of about 200 to 350° F. The fluidized bed 36 in the reactor 10 was about 46.5' deep and amounted to about 264 tons. The temperature during regeneration was about 1105° F. The amount of catalyst in the dense fluidized bed 98 in the regeneration zone 12 was about 35 tons.

*Table 1*

| | Before Using This Invention | | After Using This Invention | |
|---|---|---|---|---|
| Field Test No. | A | B | C | D |
| Fresh Feed Rate, b./d. | 13,738 | 14,433 | 15,250 | 14,102 |
| Gravity, °API | 59.5 | 59.1 | 58.3 | 58.4 |
| Characterization Factor | 12.024 | 12.014 | 11.989 | 12.006 |
| Total Feed Rate, b./d. | 16,458 | 18,331 | 16,805 | 16,635 |
| Catalyst, 20-40 Microns, % by Weight | 3.0 | 3.0 | 11.0 | 9.0 |
| Operating Conditions: | | | | |
| Reactor Average Temp., °F | 977 | 970 | 954 | 950 |
| Regen. Avg. Temp., °F | 1,133 | 1,130 | 1,104 | 1,106 |
| Recycle Gas Temp., at Reactor Inlet, °F | 1,104 | | 1,085 | 1,068 |
| Naphtha Inlet Temp., °F | 990 | 997 | 985 | 980 |
| Recycle Gas Rate, s.c.f./b | 8,247 | 7,614 | 7,609 | 8,698 |
| Hydrogen Conc., Mol. Percent | 51.18 | 51.54 | 55.0 | 56.6 |
| W./hr./w | 0.2627 | 0.2870 | 0.314 | 0.284 |
| Catalyst/Oil Ratio | 1.416 | 1.197 | 2.07 | 2.62 |
| Regenerator Catalyst Loss—Tons Per Day | 1.0 | 1.0 | <0.50 | <0.50 |
| Yields (Output) on Fresh Feed: | | | | |
| $C_4$, Vol. Percent | 7.29 | 6.81 | 8.20 | 8.36 |
| $C_5$, Vol. Percent | 4.41 | 4.73 | 6.08 | 5.71 |
| $C_5+$, Vol. Percent | 63.98 | 65.17 | 67.7 | 67.5 |
| Dry Gas ($C_3-$) Wt. Percent— | | | | |
| $H_2$, Wt. Percent on F.F. | 1.69 | 1.74 | 1.79 | 1.76 |
| $C_1$, Wt. Percent on F.F. | 4.50 | 4.39 | 3.27 | 3.14 |
| $C_2$, Wt. Percent on F.F. | 6.43 | 6.22 | 4.80 | 4.56 |
| $C_3$, Wt. Percent on F.F. | 7.54 | 7.55 | 6.36 | 6.49 |
| Carbon, Wt. Percent on F.F. | 2.476 | 2.179 | 2.12 | 2.18 |
| $C_5+$ Quality: | | | | |
| Gravity, °API | 43.7 | 44.6 | 44.2 | 44.1 |
| Octane No., Res. Cl | 97.5 | 97.0 | 97.4 | 97.0 |
| Relative Catalyst Activity: Wt. Percent on Correlated Data | 48.46 | 54.32 | 84.9 | 96.7 |

| Size | A | D | G | H | I | R | S | Z |
|---|---|---|---|---|---|---|---|---|
| | | Inside Diameter | Inside | Inside | Inside Diameter | | | |
| 5 | 6'—2" | 22" | 9½" | 4¾" | 11½" | 17" | 4'9" | 5'10" |
| 6½ | 7'—3" | 2'—0½" | 12¾" | 5¼" | 13" | 21⅛" | 5'—5⅛" | 6'10¾" |
| 12 | 12'—2" | 3'—7" | 22" | 9½" | 23" | 3'—0¾" | 9'—1¼" | 11'—2" |
| 13 | 13'—8" | 4'—0" | 2'—2" | 10½" | 2'—2" | 3'—6¾" | 10'—1¼" | 12'—4" |

The catalyst-to-oil weight ratio going to the reactor 10 was about 1.65. The w./hr./w. in the reactor 10 was about 0.3. The total naphtha feed was about 16,000 barrels per day.

For the volume of hydroformate vapors and gases passing up into the dilute phase 42 in the reactor 10, the cyclone separators 46 and 56 forming the primary and secondary stages were Ducon Number 13-SDC and the third stage cyclone separator 66 was a smaller cyclone separator designed as Ducon Number 12-SDC as above noted.

The regenerator 12 had a diameter of about 9' 10" at its lower portion and the depth of the bed of catalyst in this bottom portion was about 17' above the bottom. The straight side of the regenerator to the swage was about 20' and the height from the swage to the top of the straight side of the regenerator was 45'. Two sets of cyclone separators were arranged in the upper smaller diameter section of the regenerator vessel 12.

The primary and secondary cyclone separators 105 and 107 of each set in the regeneration vessel 12 are of the same size, namely, Ducon Number 6½ SDC (unlined) and the tertiary cyclone separator 109 of each set in the regeneration vessel 12 was smaller, namely, Ducon Number 5-SDC (unlined). The inlet velocity to primary and secondary cyclone separators 105 and 107 was about 50 feet per second and the inlet velocity to tertiary cyclone separator 109 in regenerator vessel 12 was about 75 feet per second.

The following data show that with the introduction of the smaller tertiary cyclone separator 109 as a substitute for the previously used larger tertiary cyclone separators, increased recovery of 0 to 40 micron catalyst particles was obtained and this resulted in more efficient operation of the hydroforming unit.

The data of Table 1 compares the fluid hydroformer operation before and after the use of the subject invention. The first two columns A and B report hydroforming operations using equilibrium catalyst containing about 3 percent by weight of 20-40 micron particles and the second two columns C and D report hydroforming data obtained in the same unit modified to embody the invention of this case. For columns A and B the primary, secondary and tertiary cyclone separators in the regenerator were the same size, namely, Ducon Number 6½-SDC-unlined, to give an inlet velocity of about 50 feet per second.

Prior to start the runs reported as C and D in Table 1, the tertiary cyclone separators were changed from a Ducon Number 6½ to Ducon Number 5, both SDC-unlined—and this change in size increased the inlet velocity to each tertiary cyclone to about 75 feet per second. At this time similar changes in the tertiary cyclone separators on the reactor side were not made as a slurry return circuit was used to recover catalyst carryover from the reactor to the fractionator. While this specific example reports improved regeneration vessel catalyst recovery, the invention is also applicable to the reactor side where a smaller tertiary cyclone separator can be used to increase the inlet velocity to the cyclone separator by at least 50 percent and up to 200 percent to improve recovery of catalyst fines and to eliminate or reduce the need of the slurry return circuit.

In this operation at least 9 percent by weight of 10 to 40 micron catalyst particles were held in the hydroforming unit with the same severity of operation to obtain about 97 octane number, clear, with a higher $C_5+$ yield. These data show that improved operation and results were obtained with a lower hydroforming temperature and higher product selectivity in that there is about a 3 percent higher C₅+ yield and a slightly lower carbon was indicated.

The operations as indicated in columns C and D, obtained during the period after the installation of the smaller tertiary cyclone separators, were subsequently improved as the fines concentration in the circulating catalyst increased due to attrition and improved retention of fines in the system. Fresh catalyst make-up contains approximately 15 percent by weight 10 to 40 micron particles and this also improved the operation because of better retention of fines.

By using correlations to adjust for all operating variables, the net improvement in C₅+ yield obtained with this invention is estimated at about 0.8 percent and in a plant of the above size is worth approximately $1200.00 a day.

Where three or more cyclone separators are used, the second cyclone separator may be smaller than the primary cyclone separator but it is essential that the tertiary or terminal stage cyclone separator be selected so that the inlet velocity in the terminal stage is at least 50 percent greater than that of the primary stage and may go up as high as 200 percent greater than that in the primary cyclone separator.

The present invention is especially useful in recovery of expensive catalyst fines and it is also useful in eliminating fine particles from fumes being discharged into the atmosphere to prevent pollution of the atmosphere.

While Ducon cyclone separators have been specifically referred to, it is to be understood that the invention is not limited thereto as other cyclone separators such as Buell cyclone separators and the like may be used.

The invention is also applicable and useful for systems employing only two cyclone separators in series.

While fluid bed reactors and regenerators have been specifically described and used, it is to be understood that the present invention has wider application and may be used in other processes as for example in hydrocarbon conversion processes using a transfer line reactor where the upflow velocity through the reactor is about 10 to 50 feet per second and piston flow of the solids and hydrocarbons is obtained. The invention is useful in all fluidized solids technique processes especially those using finely divided catalyst where it is important to retain at least 10 percent by weight of 10 to 40 micron size catalyst particles.

The superficial velocity of the gaseous fluid passing up through the dense fluid beds in the reactor and regenerator in the hydroforming operation may be between about 0.3 and 5 feet per second, the higher velocities being used for the more active catalysts.

What is claimed is:

1. An apparatus of the character described including a vessel having an inlet and outlet for finely divided solids, an inlet and outlet for gaseous fluid, said inlet for gaseous fluid being in the bottom portion of said vessel whereby gaseous fluid passing upwardly through said vessel will carry entrained finely divided solids, a plurality of cyclone separators arranged in series and in the upper part of said vessel and each being provided with a dipleg and means associated with said last stage cyclone separator to increase the inlet velocity of the gaseous fluid entering said last cyclone separator at least 50 percent greater than that of the first stage cyclone separator.

2. An apparatus of the character described including a vessel having an inlet and outlet for finely divided solids, an inlet and outlet for geaseous fluid, said inlet for gaseous fluid being in the bottom portion of said vessel whereby gaseous fluid passing upwardly through said vessel will carry entrained finely divided solids, a plurality of cyclone separators arranged in series and in the upper part of said vessel and each being provided with a dipleg, and means including a line communicating with the inlet to said last stage cyclone separator to introduce extraneous gas to said inlet whereby to increase the inlet velocity of the gaseous fluid entering said last stage cyclone separator at least 50 percent over that of the inlet velocity of the first stage cyclone separator.

3. In an apparatus including a vessel provided with means to maintain a dense fluidized bed of solids in said vessel including an inlet for a gaseous fluid for upward passage through said vessel and cyclone separators in series for removing entrained solids from gaseous fluid before it leaves said vessel and returning the recovered solids to the dense fluidized bed, the improvement which comprises selecting a smaller cyclone separator as the last stage than used in the earlier stage to increase the inlet velocity of the gaseous fluid into said smaller cyclone separator by at least 50% over that in a prior cyclone separator and effect separation of entrained fines and returning them to said dense fluidized bed in said vessel.

4. A process for the catalytic conversion of hydrocarbons in the production of motor fuels which comprises introducing hot finely divided catalyst having a particle size between about 0 and about 150 microns and with about at least 10 percent by weight of 10 to 40 micron size catalyst particles into a conversion zone, introducing hot hydrocarbon vapors into the bottom portion of said conversion zone at a velocity to provide a dense fluidized bed having a dilute phase thereabove of a less dense gaseous fluid suspension, maintaining said conversion zone at a temperature between about 850° F. and 1000° F., separating entrained solid catalyst particles from the vaporous reaction products leaving said dense fluidized bed of catalyst particles and effecting such separation in a plurality of centrifugal separation stages by passing all of the vaporous reaction products through all of said stages in series with the inlet linear velocity to said first separation stage being at least about 50 feet per second, returning separated catalyst particles to said fluidized bed and increasing the inlet velocity of the vaporous reaction products entering said last separation stage by at least 50% over that in a prior separation stage to recover 10 to 40 micron catalyst particles and to maintain the selected percentage of 10–40 micron catalyst particles in said dense fluidized bed and removing a single stream of substantially denuded vaporous reaction products from said conversion zone.

5. A process for the catalytic hydroforming of hydrocarbons in the production of motor fuels which comprises introducing into a conversion zone hot finely divided catalyst having a particle size between about 0 and about 150 microns and with about at least 10 percent by weight of 10 to 40 micron size catalyst particles, introducing hot hydrocarbon vapors and hydrogen-containing gas into the bottom portion of said conversion zone at a velocity to provide a dense fluidized catalyst bed having a dilute phase thereabove of a less dense gaseous fluid suspension, maintaining said conversion zone at a temperature between about 850° F. and 1000° F. and at a pressure between about 100 and 750 p.s.i.g., separating entrained solid catalyst particles from the vaporous hydroformed products leaving said dense fluidized bed of catalyst particles and effecting such separation in a plurality of centrifugal separation stages, returning separated catalyst particles to said fluidized bed and increasing the inlet velocity of the vaporous hydroformed products entering said last separation stage by at least 50% over that in a prior separation stage to recover 10 to 40 micron catalyst particles and to maintain a substantial percentage of 0–40 micron catalyst particles in said dense fluidized bed.

6. A process for the catalytic conversion of hydrocarbons in the production of motor fuels which includes the improvement which comprises introducing hot carbonaceous contaminated finely divided catalyst having a particle size between about 0 and about 150 microns and with at least about 10 percent by weight of 10 to 40 micron size catalyst particles into a regeneration zone, introducing air into the bottom portion of said regeneration zone at a velocity to provide a dense fluidized bed having a dilute phase thereabove of a less dense gaseous fluid suspension, maintaining said regeneration zone at a temperature between about 1000° F. and 1200° F., separating entrained solid catalyst particles from the gaseous combustion products leaving said dense fluidized bed of catalyst particles and effecting such separation in a plurality of centrifugal separation stages, returning separated catalyst particles to said fluidized bed and increasing the inlet velocity of the vaporous reaction products entering said last separation stage by at least 50% over that in a prior separation stage to recover 10 to 40 micron catalyst particles and maintain the desired percentage of 10–40 micron catalyst particles in said dense fluidized bed in said regeneration zone.

7. A process for contacting gaseous fluid with finely divided solids mostly in the size range of 0 to 150 microns and wherein it is essential to maintain at least about 10 percent by weight of 0 to 40 micron solids in the solids to insure proper fluidity of the finely divided solids, which comprises maintaining two contacting zones with fluidized beds of solids in the lower portion thereof, introducing and withdrawing gaseous fluid and finely divided solids into and from each of said contacting zones, circulating finely divided solids between said zones, centrifugally separating entrained solids from gaseous fluid in stages before it leaves said contacting zones and returning such separated solids to said fluidized beds in said contacting zones, and increasing the inlet velocity of the gaseous fluid to said last separation stage of at least one of the contacting zones to be about at least 50 percent greater than that in said first separation stage of said last mentioned zone to effectively separate 10–40 micron solids for return to the process for maintaining at least the selected amount of 10–40 micron solids in said fluidized beds and circulating solids.

8. An apparatus for contacting finely divided solids of a size between about 0 and 150 microns and having at least 10 percent by weight of 10 to 40 micron solids, including two contacting vessels, means for introducing and withdrawing finely divided solids into and from said vessels, means for circulating finely divided solids between said vessels, means for maintaining fluidized dense beds in said vessels which includes lines for introducing fluidizing gas into the bottom portion of said vessels, means in the upper portion of said vessels for separating entrained solids from gaseous fluid before it leaves said vessels, said last mentioned means including centrifugal separation stages in each vessel, the last separation stage in at least one vessel being selected to increase the inlet linear velocity of the gaseous fluid therein at least 50 percent over that in an earlier separation stage to effectively recover 10–40 microns and maintain the desired percentage of 10–40 micron material in the apparatus.

9. In a process for the catalytic fluid hydroforming of hydrocarbons wherein finely divided catalyst is circulated between a hydroforming zone and a regeneration zone each containing a dense fluidized bed of catalyst particles having a particle size between about 0 and 150 microns with most of the particle sizes being between about 20 and 80 microns and in which it is necessary to maintain at least about 10% by weight of 0 to 40 micron size particles and a plurality of cyclone separator stages are used in the upper portion of each zone to separate entrained solids from gaseous fluids leaving said dense beds, the improvement which comprises increasing by at least about 50% the inlet velocity of the gaseous fluid entering said last cyclone separation stage of at least one zone as compared to the inlet velocity of a prior cyclone separation stage to recover 0–40 micron size particles and return them to the dense fluidized bed in said zone to maintain the desired percentage of 0–40 micron size catalyst in the dense bed of catalyst in said zone.

10. A process according to claim 9 wherein said zone is said regeneration zone.

11. A process according to claim 9 wherein said cyclone separation stages include three stages.

12. A process according to claim 9 wherein the inlet velocity of said last cyclone separation stage is between 50% and 200% greater than that in said first cyclone separation stage.

13. A process for removing fines from gaseous fluids which comprises passing solids laden gaseous fluid through a plurality of cyclone separators in series and increasing the inlet velocity of the terminal stage cyclone separator at least 50% over that of the primary cyclone separator.

14. A process according to claim 13 wherein said cyclone separators are arranged in a vessel containing fines suspended in gaseous fluid.

15. A process according to claim 13 wherein the inlet velocity to said first cyclone separator is at least about 50 feet per second.

16. A process for contacting gaseous fluid with finely divided solids mostly in the size range of 0 to 150 microns and wherein it is essential to maintain at least about 10 percent by weight of 0 to 40 micron solids in the solids to insure proper fluidity of the finely divided solids, which comprises maintaining a fluidized bed of solids in the lower portion of a contacting zone, introducing and withdrawing gaseous fluid and finely divided solids into and from said contacting zone, centrifugally separating entrained solids from gaseous fluid in stages after the gaseous fluid leaves said fluidized bed of solids, recovering the solids so separated and returning them to the process, and increasing the inlet velocity of the gaseous fluid to said last separation stage to be about 50% greater than that in said first separation stage to effectively separate 10–40 micron solids for return to the process for maintaining at least the selected amount of 10–40 micron solids in said fluidized bed.

References Cited in the file of this patent

UNITED STATES PATENTS

| | | |
|---|---|---|
| 2,341,193 | Scheineman | Feb. 8, 1944 |
| 2,399,509 | Rich | Apr. 30, 1946 |
| 2,421,212 | Medlin | May 27, 1947 |
| 2,423,850 | Peery | July 15, 1947 |
| 2,526,486 | Krebs | Oct. 17, 1950 |
| 2,535,140 | Kassel | Dec. 26, 1950 |
| 2,710,827 | Gornowski | June 14, 1955 |